3,045,020
NEW CHEMICAL COMPOUNDS USEFUL IN THE SYNTHESIS OF EMETINE
Alan Rushton Battersby, Westbury-on-Trym, Bristol, England, assignor to Whiffen and Sons Limited, London, England
No Drawing. Filed Aug. 20, 1958, Ser. No. 756,747
Claims priority, application Great Britain May 27, 1957
21 Claims. (Cl. 260—287)

The present application is in part a continuation of copending application Serial No. 735,963, filed May 19, 1958 (abandoned since the filing of the present application).

The present invention relates to new chemical compounds useful in the synthesis of emetine.

It has been found that the particular new compounds in the stereoisomeric form hereinafter specified as capable of being converted to emetine.

Accordingly the present invention is for the new chemical compounds of the following Formula A:

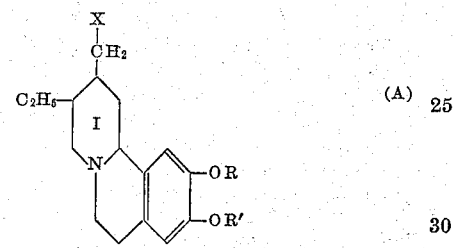

wherein X is a carboxylic acid radical or a salt or derivative thereof and R and R' are hydrogen or alkyl groups, and wherein the ring I possessing three asymmetric carbon atoms is in the stereoisomeric form B, in which the ethyl group and the CH$_2$—X group are in the trans configuration, which may be represented as:

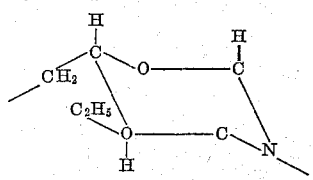

These novel compounds may alternatively be represented in the following conventional form:

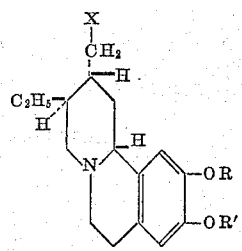

or as the mirror image

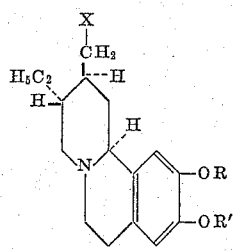

wherein X, R and R' have the significance indicated above.

The present invention also covers the production of these new compounds as hereinafter described.

As examples of salts and derivatives of the carboxylic acid radical X may be mentioned the alkali metal, ammonium and amine salts, and derivatives such as the esters, amides, for example the homoveratryl amide, nitrile and the like. The groups R and R' are preferably methyl, as these are the groups required in the synthesis of emetine. These groups may also be ethyl, propyl etc.

The compounds according to the present invention may exist either as the amino acid, or in the form of a salt of the tertiary amine, such as the hydrochloride salt.

The present invention also relates to a process for the production of emetine which comprises condensing with homoveratrylamine a DL-compound of the following formula, which represents for convenience also the mirror image:

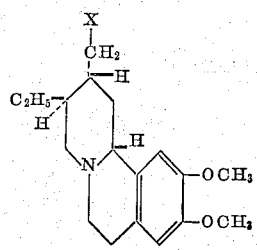

wherein X is a reactive functional derivative of a carboxylic radical, such for example as an acid chloride, anhydride or azide, cyclising the resulting DL compound to DL-O-methylpsychotrine, resolving said DL-O-methylpsychotrine and hydrogenating the (+)-O-methylpsychotrine to give emetine. The process may also be carried out using as a starting material the appropriate optical isomer of the formula indicated above, in which case resolution of the O-methylpsychotrine is not required.

The following examples are given to illustrate the process of the present invention. The parts quoted are by weight unless otherwise indicated.

Example 1

The trans isomer of the lactone of the formula:

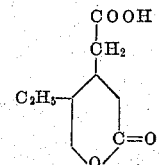

which may be prepared as described in Zhur. Obshchei Khim. (Journal of General Chemistry), volume 22, 1952, pages 1890–5 (Chem. Abstracts, 1953, p. 7507) is resolved into its optically active forms using the strychnine or brucine salt, or salt with other optically active bases, and the appropriate isomer is converted by treatment with thionyl chloride into the acid chloride. The acid chloride is isolated and treated with ammonia to give the amide of the formula:

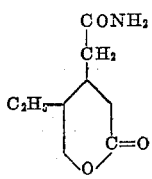

which is converted to the corresponding nitrile by treatment with thionyl chloride or phosphorus oxychloride. This nitrile is heated with homoveratryl amine to give the amide of the formula:

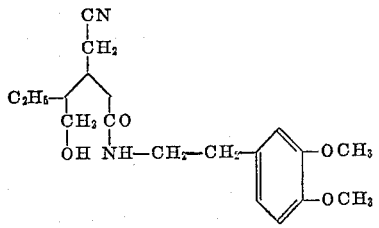

This amide is separated and cyclised with phosphorus oxychloride to give the quaternary salt of the formula:

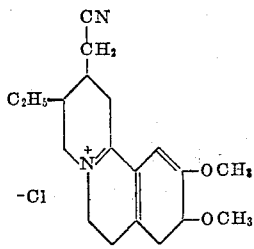

This quaternary salt is hydrogenated over a palladium catalyst with hydrogen at atmospheric pressure and room temperature to produce the nitrile of the Formula A above where the group X is a —CN radical and where R and R' are methyl groups. This nitrile is crystallised from aqueous alcohol in the form of colourless needles of melting point 154–155° C.

*Example 2*

The nitrile prepared as described in Example 1 is hydrolysed to the corresponding acid by long heating with aqueous alcoholic sodium hydroxide. This acid is crystallised as the corresponding hydrochloride from dilute hydrochloric acid in the form of colourless needles of melting point of about 200–202° C. This melting point is found to vary with the conditions used for drying and the rate of heating in the melting point apparatus. The hydrochloride is of the formula:

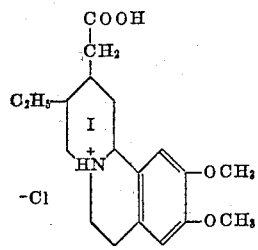

where the ring I is of the stereoisomeric form B shown above.

The acid is converted to the corresponding methyl ester which is crystallised from light petroleum in the form of colourless fine needles of melting point 98–99° C., specific rotation in methyl alcohol using sodium D line —36° (minus 36 degrees).

*Example 3*

The acid produced as described in Example 2 is converted to the sodium salt and treated with oxalyl chloride at 10° C. to give the corresponding acid chloride which is condensed with homoveratryl-amine to give the amide of melting point 171.5–172.5° C. of the following formula:

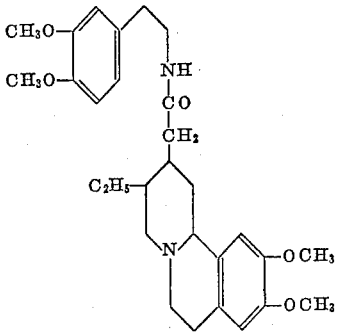

This amide is cyclised by treatment with phosphorus oxychloride in boiling toluene to give O-methylpyschotrine which is isolated as the crystalline hydrogen oxalate salt of melting point 151–155° C. Hydrogenation of the O-methylpyschotrine base in ethyl alcohol at atmospheric pressure and room temperature over a platinum catalyst gave a mixture of emetine and isoemetine. The emetine was isolated from this mixture in the form of its hydrobromide salt.

*Example 4*

The acid produced as in Example 2 is converted to the triethylamine salt in dimethylformamide solution using slightly over two equivalents of triethylamine. The solution is cooled to —5° C. and a slight excess over one equivalent of ethylchloroformate added with stirring. After twenty minutes an excess over two equivalents of homoveratrylamine added and the mixture is stirred for one hour at 0° C. forming the homoveratryl amide, melting point 171.5 to 172.5° C.

*Example 5*

The compound of the formula:

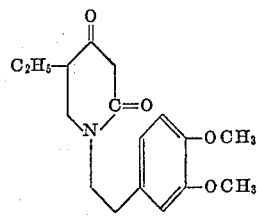

prepared as described by Ban (C.A., 1956, 50, 1854) is reduced catalytically in ethanol over platinum at room temperature (20 to 30° C.) and atmospheric pressure to give a mixture of the corresponding isomeric alcohols. (The starting compound can also be reduced with sodium or potassium borohydride in methanol at room temperature followed by half an hour at refluxing temperature to produce a mixture of the corresponding isomeric alcohols.)

Five parts of the so obtained mixture of alcohols are heated under reflux with forty parts of acetic anhydride containing ten parts of anhydrous sodium acetate for fourteen hours. The acetic anhydride is then evaporated off from an oil bath at 150° C. The dry residue is then heated under reflux with thirty parts of acetic anhydride for two hours and the solution then evaporated to dryness on an oil bath at 150° C. The neutral product amounting to four parts by weight is of the formula:

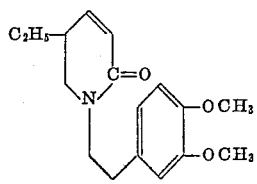

Four parts of this compound dissolved in twenty parts of dry ethanol is added over half an hour to four parts of dry diethylmalonate in sixty parts of dry ethanol containing 0.9 part of sodium ethoxide. The reaction mixture is heated under reflux for eight hours and then worked up for neutral products to give five parts of the ester of the following Formula B, which also represents the mirror image:

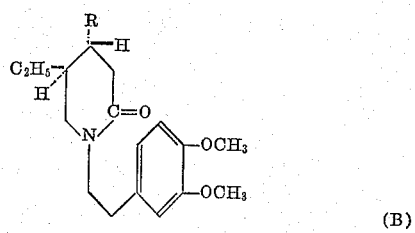

(B)

where R is the group —CH(COOC$_2$H$_5$)$_2$. This ester is maintained at 45° C. with two equivalents of 0.5 N aqueous alcoholic sodium hydroxide for twenty hours. The product is acidified and crystallised to give the corresponding acid of the Formula B, where R is the group —CH(COOH)$_2$. This acid is of melting point 151–152° C., with decomposition. The acid is heated under reflux with 60% aqueous acetic acid for fourteen hours and the product crystallises to yield the acid of Formula B above where the group R is —CH$_2$COOH, of melting point 153–153.5° C. This acid is esterified in quantitative yield in dry ethanol containing concentrated sulphuric acid. This ester is heated under reflux in dry toluene with phosphorus oxychloride for half an hour. The basic product crystallised as the perchlorate salt of melting point 113–114° C., of the following Formula C, which also represents the mirror image:

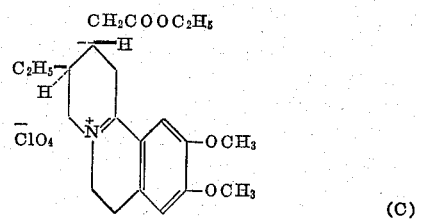

(C)

This perchlorate salt is hydrogenated over platinum in ethanol at room temperature and atmospheric pressure to give the perchlorate salt, melting point 145–146° C., of the following Formula D, which also represents the mirror image:

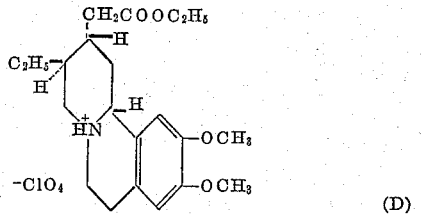

(D)

The corresponding base is recovered from this salt by basification and extraction with ether, and crystallised from petrol as needles of melting point 66–66.5° C.

The example is repeated to produce the corresponding methyl esters wherein the acid of the Formula B above, where R is —CH$_2$COOH, is esterified in dry methanol containing concentrated sulphuric acid. The methyl ester is heated under reflux in dry toluene with phosphorus oxychloride for half an hour. The basic product crystallises as the perchlorate salt of melting point 149°–150° C. (methyl ester corresponding to Formula C). This perchlorate salt is hydrogenated over platinum in ethanol at room temperature and atmospheric pressure to give the perchlorate salt of melting point 188°–188.5° C. (methyl ester corresponding to Formula D). The corresponding base is recovered from this salt by basification and extraction with ether, and crystallises from petrol as needles of melting point 74–75.5° C.

*Example 6*

The DL ester of the formula

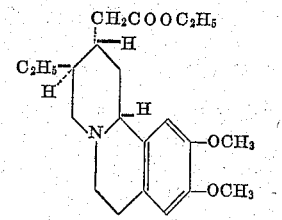

produced as described in Example 5 is hydrolysed to the corresponding acid, which is then converted to the triethylamine salt in dimethylformamide solution using a slight excess over two equivalents of triethylamine. The solution is cooled to —5° C. and a slight excess over one equivalent of ethylchloroformate added with stirring. After twenty minutes two equivalents of homoveratryl amine are added and the mixture stirred for one hour at 0° C. The DL homoveratrylamide, melting point 146.5–147.5° C. of the formula:

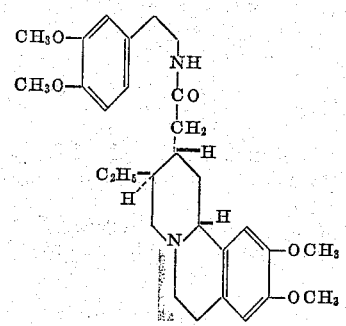

is isolated. 0.42 part of this amide is treated with 1 part of phosphorus oxychloride in 30 parts of toluene and refluxed for 1½ hours, and cyclised to give DL-O-methylpsychotrine. The DL base is converted into the dibenzoyltartrate salt which is crystallised from a methanol-ether mixture. The crystalline product is recrystallised from a methanol-ether mixture giving the optically pure salt.

The optically pure salt is converted to the base by basification and extraction with ether, and evaporation of the ether gives (+)-O-methylpsychotrine of melting point 122–123.5° C. and rotation in ethanol +42.8 using sodium D line. The quoted melting point is unchanged in admixture with natural O-methylpsychotrine base. The corresponding hydrogen oxalate salt is formed, melting point and mixed melting point with natural salt 151–155° C., rotation in ethanol +43.8, using sodium D line. This (+)-O-methylpyschotrine is identical with the natural alkaloid as shown by infra-red absorption and X-ray powder photographs.

The (+)-O-methylpyschotrine base is hydrogenated in ethyl alcohol at atmospheric pressure and room temperature over a platinum catalyst and gives a mixture of emetine and isoemetine. The emetine is isolated from this mixture in the form of its hydrobromide salt, melting point 243–245° C.; mixed melting point with natural salt 243–245° C. The synthetic emetine has a specific rotation of —49.5 in chloroform using the sodium D line. The N-benzoyl derivative of synthetic emetine has melting point 183.5–184.5° C., unchanged in admixture with a sample prepared from natural emetine.

I claim:
1. A synthetic stereoisomer selected from the group consisting of compounds of the formula

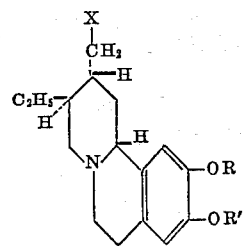

and acid addition salts thereof; X being a member selected from the group consisting of —COOH, —COOA, —CN, —COCl, —CON₃, —COONH₄, —COOCH₃, —COOC₂H₅, —COOH·N(C₂H₅)₃,

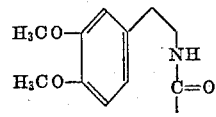

and

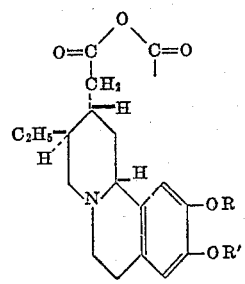

A being an alkali metal; and each of R and R' being a member selected from the group consisting of hydrogen and lower alkyl.

2. A synthetic stereoisomer selected from the group consisting of compounds of the formula:

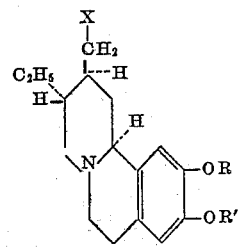

and acid addition salts thereof; X being a member selected from the group consisting of —COOH, —COOA, —CN, —COCl, —CON₃, —COONH₄, —COOCH₃, —COOC₂H₅, —COOH·N(C₂H₅)₃,

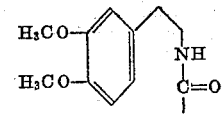

and

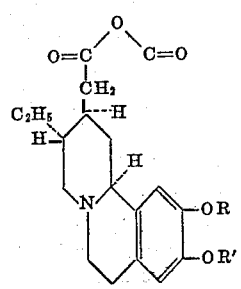

A being an alkali metal; and each of R and R' being a member selected from the group consisting of hydrogen and lower alkyl.

3. A process for the production of emetine which comprises (a) condensing with homoveratryl-amine a member selected from the group consisting of a compound of the formula:

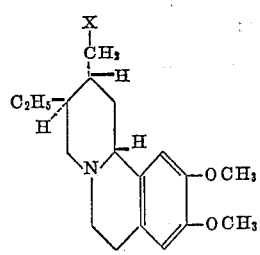

and acid addition salts thereof, wherein X is a member selected from the group consisting of —COOH, —COOA, —CN, —COCl, —CON₃, —COONH₄, —COOCH₃, —COOC₂H₅, —COOH·N(C₂H₅)₃ and

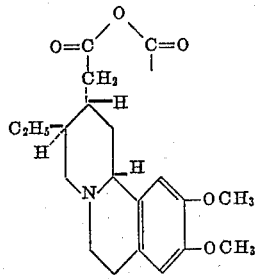

and A is an alkali metal, whereby the homoveratryl amide is formed; (b) treating said amide with a cyclising agent, whereby O-methylpsychotrine is formed; and (c) treating the O-methylpsychotrine with a hydrogenating agent, whereby emetine is formed.

4. A process for the production of emetine which comprises (a) condensing with homoveratryl-amine and a member selected from the group consisting of a compound of the formula:

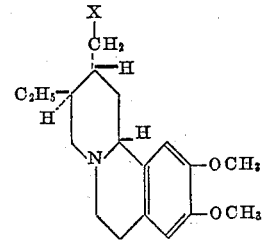

and acid addition salts thereof, wherein X is a member selected from the group consisting of —COOH, —COOA, —CN, —COCl, —CON₃, —COONH₄, —COOCH₃, —COOC₂H₅, —COOH·N(C₂H₅)₃ and

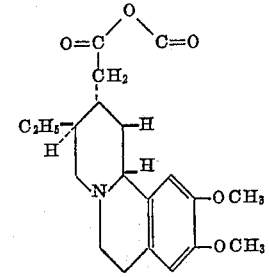

and A is an alkali metal, whereby the homoveratryl amide is formed; (b) cyclising said amide by treating same with phosphorus oxychloride as a cyclising agent, whereby O-methylpsychotrine is produced; and (c) hydrogenating the O-methylpsychotrine in contact with a platinum catalyst, whereby emetine is produced.

5. A process for the production of emetine which comprises (a) condensing with homoveratryl-amine a compound of the formula:

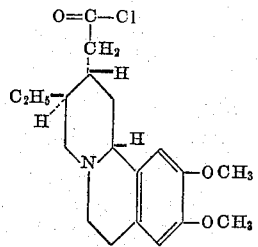

whereby the homoveratryl amide is formed, (b) cyclising the amide, whereby O-methylpsychotrine is formed; and (c) hydrogenating the O-methylpsychotrine in contact with a hydrogenation catalyst, whereby emetine is produced.

6. A process for the production of emetine which comprises (a) condensing with homoveratryl-amine a member selected from the group consisting of a DL-compound of the formula below which also represents the mirror image:

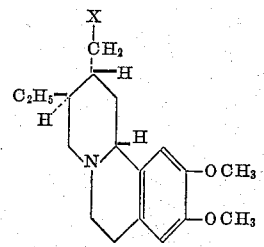

and acid addition salts thereof, wherein X is a member selected from the group consisting of —COOH, —COOA, —CN, —COCl, —CON$_3$, —COONH$_4$, —COOCH$_3$, —COOC$_2$H$_5$, —COOH·N(C$_2$H$_5$)$_3$ and

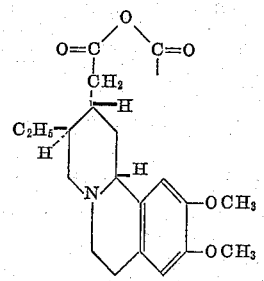

and A is an alkali metal, whereby the homoveratryl amide is formed; (b) treating said amide with a cyclising agent, whereby DL-O-methylpsychotrine is produced: (c) subjecting the DL-O-methylpsychotrine to the action of a resolving agent and separating from the product the (+)-O-methylpsychotrine; and (d) treating the (+)-O-methylpsychotrine with a hydrogenating agent, whereby emetine is produced.

7. A process for the production of emetine which comprises (a) condensing with homoveratryl-amine a member selected from the group consisting of a DL-compound of the formula below which also represents the mirror image:

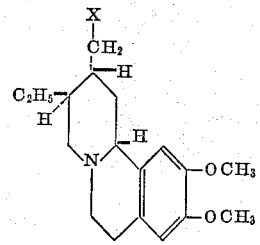

and acid addition salts thereof, wherein X is a member selected from the group consisting of —COOH, —COOA, —CN, —COCl, —CON$_3$, —COONH$_4$, —COOCH$_3$, —COOC$_2$H$_5$, —COOH·N(C$_2$H$_5$)$_3$ and

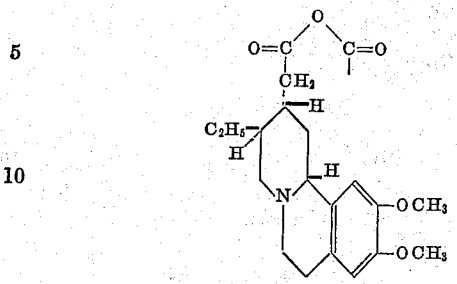

and A is an alkali metal, whereby the homoveratryl amide is formed; (b) cyclising said amide by treating same with phosphorus oxychloride as a cyclising agent, whereby DL-O-methylpsychotrine is produced; (c) converting the DL-O-methylpsychotrine into its dibenzoyltartrate salt, converting the dibenzoyltartrate salt into its corresponding base, extracting the base with ether, evaporating the ether, whereby the DL-O-methylpsychotrine is resolved, and separating (+)-O-methylpsychotrine; and (d) hydrogenating the (+)-O-methylpsychotrine in contact with a platinum catalyst, whereby emetine is produced.

8. A process for the production of emetine which comprises (a) condensing with homoveratryl-amine a member selected from the group consisting of a DL-compound of the formula below which also represents the mirror image:

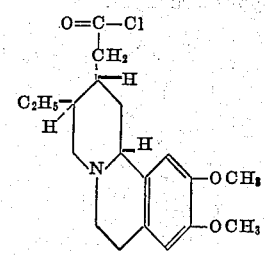

whereby the DL-homoveratryl amide is produced; (b) treating said amide with a cyclising agent, whereby DL-O-methylpsychotrine is produced; (c) subjecting the DL-O-methylpsychotrine to the action of a resolving agent and separating from the product the (+)-O-methylpsychotrine, and (d) treating the (+)-O-methylpsychotrine with a hydrogenating agent, whereby emetine is produced.

9. Synthetic racemic DL-O-methylpsychotrine which consists of isomers having the structures:

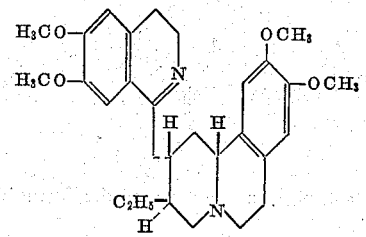

and

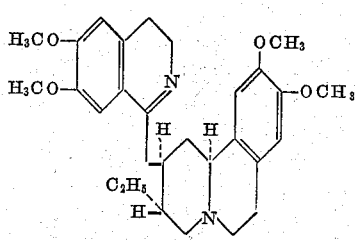

10. A synthetic compound selected from the group consisting of those of the structures:

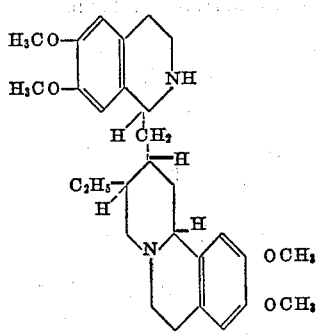

and

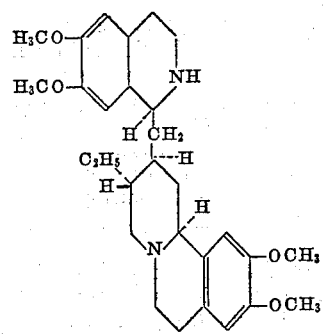

11. A synthetic racemic composition which consists of isomers having the structures:

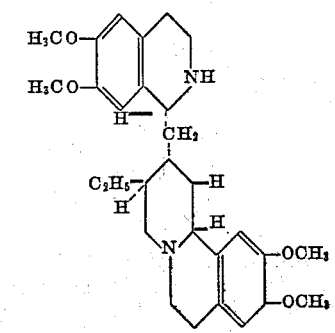

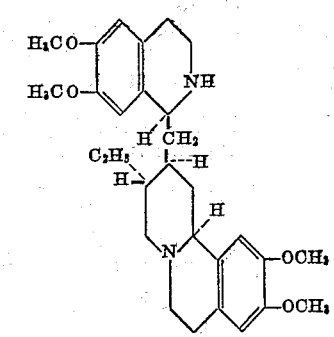

12. The synthetic compound of the formula:

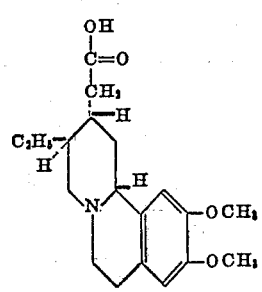

13. The synthetic compound of the formula:

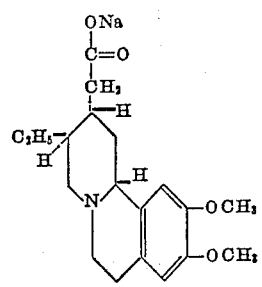

14. The synthetic compound of the formula:

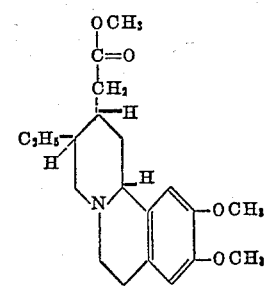

15. The synthetic compound of the formula:

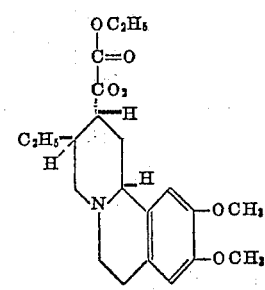

16. The synthetic compound of the formula:

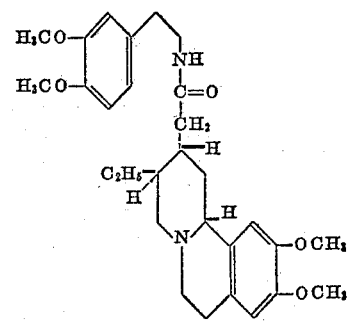

17. The synthetic compound of the formula:

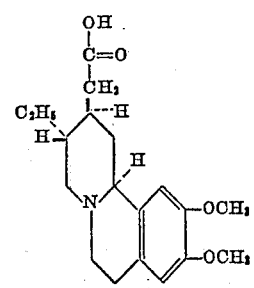

18. The synthetic compound of the formula:

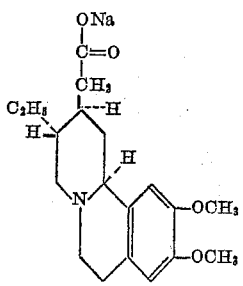

19. The synthetic compound of the formula:

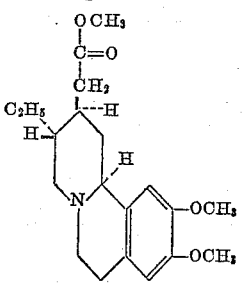

20. The synthetic compound of the formula:

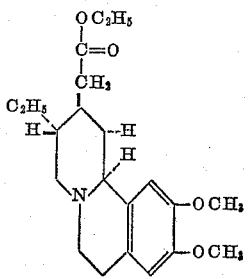

21. The synthetic compound of the formula:

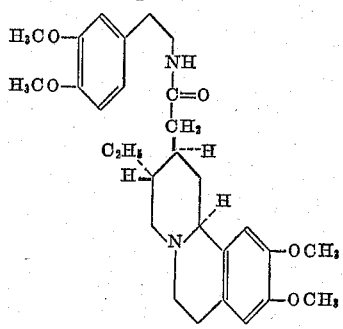

References Cited in the file of this patent

Karrer: Organic Chemistry, 2d ed., pages 92–102 (1946).

Henry: The Plant Alkaloids, page 398, lines 9 and 10, beginning "Pyman has . . .," 4th ed., Blakiston, Philadelphia (1949).

Battersby et al.: "Experentia," vol. VI/10, pages 378 and 379 (1950).

Hazlett et al.: J. Amer. Chem. Soc., vol. 73, page 2578 (1951).

Evstigneeva et al.: Chem. Abst., vol. 45, pp. 7577 and 7578 (1951).

Battersby et al.: Journal Chem. Society, pp. 2463–2464 (1953).

Battersby et al.: Chemistry and Industry, page 982, July 13, 1957.

Battersby et al.: Chemistry and Industry, page 983, July 13, 1957.